United States Patent [19]
Fahey et al.

[11] Patent Number: 5,731,051
[45] Date of Patent: Mar. 24, 1998

[54] FIBER OPTIC FUSION SPLICE PROTECTION SLEEVE

[75] Inventors: Maureen T. Fahey; Alan G. Hulme-Lowe; Charles M. Mansfield; Grieg A. Olson, all of Austin, Tex.

[73] Assignee: Minnesota Mining and Manufacturing Company, St. Paul, Minn.

[21] Appl. No.: 534,268

[22] Filed: Sep. 26, 1995

[51] Int. Cl.$^6$ .......................... G02B 6/255; B65B 53/02
[52] U.S. Cl. .......... 428/34.9; 428/35.2; 428/138; 428/346; 428/913; 138/118.1; 138/172; 138/174; 174/DIG. 8; 385/95; 385/96
[58] Field of Search ................. 428/34.9, 35.1, 428/913, 35.2, 35.3, 35.5, 343, 349, 346, 137, 138; 385/95, 96; 174/DIG. 8, 35 R, 84 R; 138/118, 118.1, 172, 174

[56] References Cited

U.S. PATENT DOCUMENTS

| | | | |
|---|---|---|---|
| 4,254,865 | 3/1981 | Pacey et al. | 206/316 |
| 4,509,820 | 4/1985 | Murata et al. | 350/96.21 |
| 4,693,767 | 9/1987 | Grzanna et al. | 174/DIG. 8 |
| 4,778,242 | 10/1988 | Ota et al. | 350/96.21 |
| 4,863,234 | 9/1989 | Gladenbeck et al. | 350/96.21 |
| 5,009,474 | 4/1991 | Wurmser et al. | 350/96.2 |
| 5,087,492 | 2/1992 | Vallauri et al. | 174/DIG. 8 |
| 5,157,751 | 10/1992 | Maas et al. | 385/99 |
| 5,367,589 | 11/1994 | MacDonald et al. | 385/37 |
| 5,367,591 | 11/1994 | Seike et al. | 385/51 |
| 5,426,714 | 6/1995 | Gadkaree et al. | 385/39 |
| 5,430,821 | 7/1995 | Sasoka et al. | 385/99 |
| 5,486,388 | 1/1996 | Pertas et al. | 174/DIG. 8 |

FOREIGN PATENT DOCUMENTS

| | | |
|---|---|---|
| 59-28113 | 2/1984 | Japan. |
| 60-61706 | 5/1985 | Japan. |
| 62-293211 | 12/1987 | Japan. |
| 2291508 | 12/1990 | Japan. |
| 2111238 | 6/1983 | United Kingdom. |

OTHER PUBLICATIONS

Brochure entitled "How well do various blends of LCP and nylon 12 work?" by Tai-Shung Chung, Celanese Specialties Division, Summitt, New Jersey, Plastics, Oct. 1987, pp. 39–41.

*Primary Examiner*—Rena Dye
*Attorney, Agent, or Firm*—Gerald F. Chernivec; John C. McFarren

[57] ABSTRACT

A sleeve for protecting and reinforcing a fusion splice of two or more optical fibers. The fusion splice protector includes a heat-shrinkable sleeve adapted to surround the fusion splice and adjacent portions of the fused optical fibers, a stress-relieving support element adjacent the fusion splice, and a hot-melt adhesive contained within the sleeve for retaining the support element adjacent a longitudinal section of the sleeve. The support element is designed to impart varying elasticity along a length of the sleeve such that the fusion splice protector is more rigid at the central portion of the sleeve member than at its ends. This may advantageously be achieved by providing a support element having a cross-sectional profile which varies along the length of the sleeve. The support element is preferably constructed of a polymer or polymer blend, most preferably one having a coefficient of thermal expansion which is approximately equal to the coefficient of thermal expansion of the optical fibers.

14 Claims, 2 Drawing Sheets

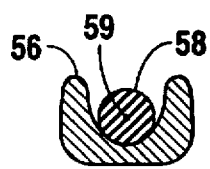
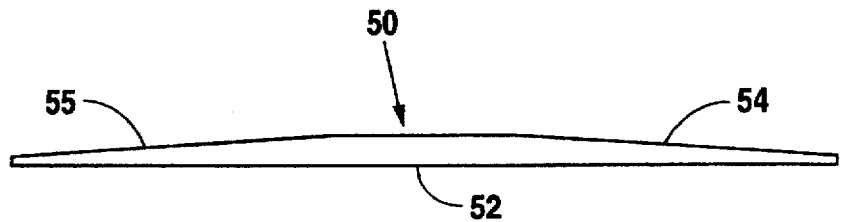
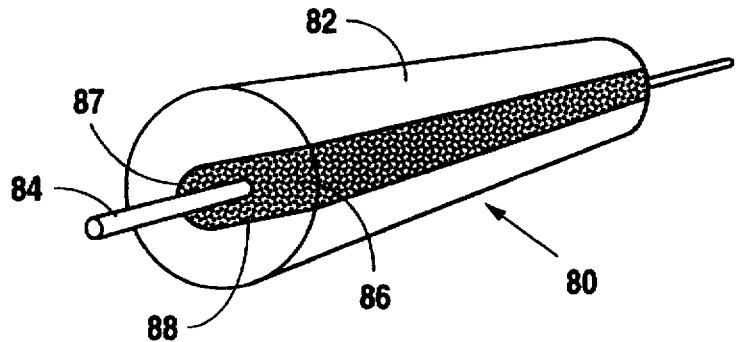
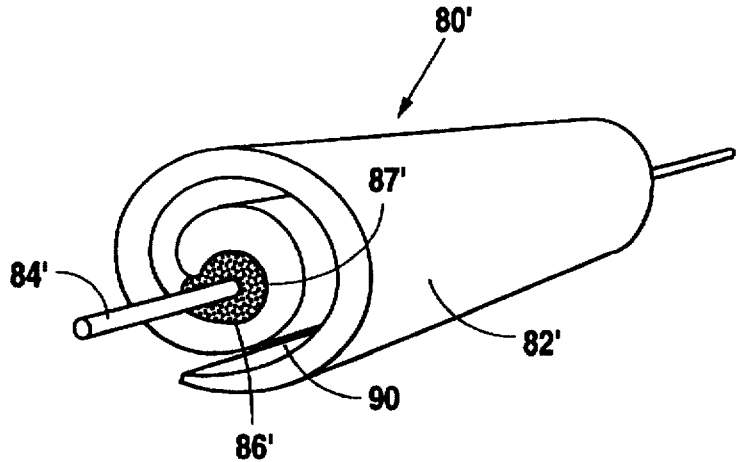

FIBER OPTIC FUSION SPLICE PROTECTION SLEEVE

BACKGROUND OF THE INVENTION

1. Field of the Invention

The present invention generally relates to devices for interconnecting communications lines, such as optical fibers, and more particularly to an improved protective packaging or reinforcement assembly that protects a splice formed by fusion welding two lengths of optical fiber. A support element, included in the protective packaging or reinforcement assembly, contains design features to eliminate points of weakness, on either side of the splice, where the potential for optical fiber fracture exists.

2. Description of the Prior Art

Fusion bonding of optical fiber pairs placed in end-to-end axial alignment is well known for providing extended lengths of optical fiber cable. This splicing method, while effective for increasing optical signal transmission distances, causes physical weakness near the point of splice formation. U.S. Pat. No. 5,157,751 suggests that the typical breaking strength of spliced fiber is between 15% and 20% of the breaking strength of the unspliced fiber. The splice, therefore, needs protecting from forces of tension, torsion or bending. To protect the splice, the prior art uses a variety of reinforcement assemblies. For example, U.S. Pat. No. 4,254,865 discloses a protective package comprising two elongate plastic members with a layer of adhesive on the front face of each member. The spliced portion of an optical fiber, placed between the front faces of opposing plastic members, forms a sandwich structure wherein the optical fiber is engulfed in adhesive that unites the plastic members with their longitudinal axes parallel to the longitudinal axis of the optical fiber. U.S. Pat. No. 4,778,242 describes a similar protective sandwich structure to protect the optical fiber splice. In that case, elongate glass members increase the rigidity of the fully applied reinforcement assembly. U.S. Pat. No. 4,509,820 provides packaging for the spliced portion of an optical fiber having a heat shrink tube as the outermost element of protection. The reinforcement assembly in this case comprises at least one cylindrical electrical resistance element, adjacent and parallel to the optical fiber splice, that heats to shrink the heat shrink tube, thereafter providing reinforcement in the area of the fiber splice. When fully applied, the splice packaging surrounds the fiber and resistance element with a hot-melt material confined within the heat shrink tube. Another U.S. Pat. No. 4,863,234, describes a hot-melt material in the form of a fusion bonding sleeve surrounding the splice and a shrinkable sleeve surrounding the fusion bonding sleeve. An oblong support occupies a position between the fusion bonding sleeve and the shrinkable sleeve. Upon heating, the fusion bonding sleeve melts, flowing around the spliced optical fiber. In the same time frame, the heated, shrinkable sleeve shrinks to draw the support element into contact with the molten bonding agent thereby directing its flow along the length of the optical fiber splice. Upon cooling, the bonding agent solidifies to secure the reinforcement assembly. The provision of strength by external support to an optical cable splice appears in the prior art to be essential to continued satisfactory signal transmission through an optical cable. This subject is addressed in U.S. Pat. No. 5,009,474, which provides a device to protect the splice against damage which could occur when the cable is stretched. For this purpose a number of tension resistant fibers lie adjacent to the splice with their longitudinal axes parallel to each other and to the cable. A shrinkable sleeve draws the tension resistant fibers, compressing them around the splice to prevent damage with tension applied to the optical fiber cable. The reinforcing assembly structure gives limited protection against shearing and buckling. Further protection against deflection forces results from incorporation of at least one metal wire co-axial with the compressed, tension-resistant fibers. In effect, this assembly immobilizes the fusion splice. Another method of immobilizing a fusion splice in an optical cable is described in U.S. Pat. No. 5,157,751, which describes encasing the spliced portion of the optical fiber cable in a rigid metal tube and filling the length of the tube with curable epoxy resin. Other splice-immobilizing, rigid supports, in the form of glass reinforcing members, are disclosed in U.S. Pat. No. 5,367,591. Those inventors also take advantage of additional reinforcement provided by a protective member hermetically sealed at each end of the reinforcing member or completely covering the spliced section of the optical fiber cable.

It is clear from the foregoing discussion that inventions to protect fusion spliced sections of optical fiber cable place significant emphasis on eliminating stress from the fiber splice itself. Techniques for stabilizing splices and preventing dimensional change required the use of rigid reinforcement, including methods to immobilize the fiber containing a splice. This effort reflects the desire to maintain the signal transmission capabilities of the splice while preventing any fracture-producing force upon it. Emphasis on splice protection draws attention away from the potential for introduction of points of weakness in the optical fiber upon completion of splice packaging as previously described. Points of weakness occur at opposite ends of a splice reinforcing assembly. Where the optical fiber emerges from the rigid packaging, there is an abrupt transition from substantial to minimum fiber support. Any force that deflects the unsupported fiber will cause stress concentration where it exits from the splice reinforcement assembly. The benefits of splice reinforcement are thus offset by the formation of potential fracture sites in other parts of the optical fiber. It would, therefore, be desirable and advantageous to devise a fusion splice protection sleeve which would overcome these disadvantages.

SUMMARY OF THE INVENTION

The present invention provides an assembly for use with optical fibers for protecting and reinforcing a fused fiber section that joins a plurality of optical fibers, the assembly generally comprising an elongate sleeve member adapted to surround the fusion splice and adjacent portions of the optical fibers, and a reinforcing member or support element which imparts controlled flexibility along a length of the sleeve member such that the assembly is more rigid at a central portion of the sleeve member than at its ends, and will not permanently deform when bent. The sleeve member is thermoelastically recoverable, i.e., heat-shrinkable, and the reinforcing member may have a cross sectional profile which varies along its length to impart the varying elasticity. Alternatively, a uniform cross sectional profile may be provided to impart overall increased flexibility. Means, such as a hot-melt adhesive, may additionally be provided to retain the support element adjacent the longitudinal section of the sleeve member; the hot-melt adhesive also serves as an environmental seal.

When installed, the assembly of the present invention surrounds the fused section of the optical fiber and buffered fiber exposed during preparation of the optical fiber cables prior to fusion splicing. The fragile combination of buffered fiber and the fused fiber section requires support that prevents fracture. Since the fused section of the optical fiber is the most fragile, the design of the support element preferably provides the most protection to this section. While the fused fiber section needs protecting, the combination of fused and buffered fiber need not be rigid over the entire length of the fusion splice protector. Instead the spliced fiber, reinforced by the support element, must flex in response to lateral forces that occur during subsequent handling of the fiber, for optimal signal transmission. Preferred support elements have a cross-section design that is relatively rigid at their center to protect the spliced section of the optical fiber. The stiffness towards each of the opposing ends of the support element gradually changes until the flexibility of supported fiber, towards each end of the support element, is preferably very close to that of unsupported fiber. Support element geometry is varied according to the equation:

Flexural Rigidity=E×I where E=Material Modulus, and I=Centroidal Moment of Inertia.

Variation of either E or I modifies the properties of the support member. Changes in E depend on useful material selection for the support element, such as polymers, polymer blends, metals, metal alloys, ceramics, etc. Design features of the support element include height, width and circular components along its length. The general equation is $I=\int y^2 dA$ wherein y=distance from the centroidal axis and dA=incremental area. As examples, for a circular cross section, this reduces to $I=\pi r^4/4$ where r is the radius and, for a rectangular cross section, $I=bh^3/12$ where b=width and h=height. Appropriate selection of E and I yields support elements that effectively protect the fragile fusion splice against mechanical stress and deformation. In some cases, however, the spliced optical fiber experiences stress that is exacerbated by a mismatch in the thermal expansion characteristics of the optical fiber and those of a protective assembly positioned around a fused portion of a fusion spliced fiber. Elimination of this problem depends on careful matching of thermal expansion coefficients of components in the protective assembly. Thus it is advantageous that the coefficient of thermal expansion of the support element be close to that of the optical fiber. The present invention, therefore, provides protection from thermally-induced stress of the fusion splice using support elements with the same rate of thermal expansion as the optical fiber. Support element shaping and thermal coefficient matching protect the fusion splice from the dual threat of mechanical and thermal stress.

BRIEF DESCRIPTION OF THE DRAWINGS

The invention will best be understood by reference to the accompanying drawings, wherein:

FIG. 7A is an end view of a splice support element which may be used with the present invention;

FIG. 7B is a side view of a splice support element which may be used with the present invention;

FIG. 8 is a perspective view of a protecting support element of the present invention;

FIG. 9 is a perspective view of an alternative protective support element of the present invention.

DESCRIPTION OF THE PREFERRED EMBODIMENT

Figure 1:
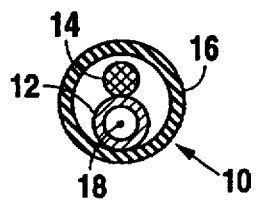
FIG. 1 is an end view of a prior art splice protection assembly.
Figure 2:
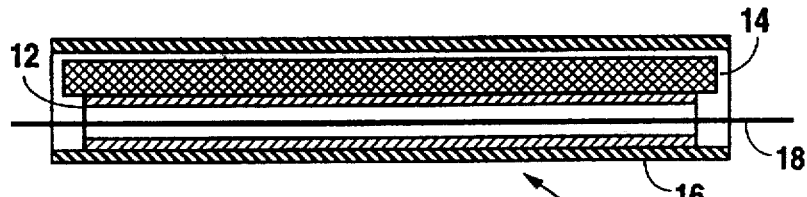
FIG. 2 is a cross sectional view of a prior art splice protection assembly.
Figure 3:
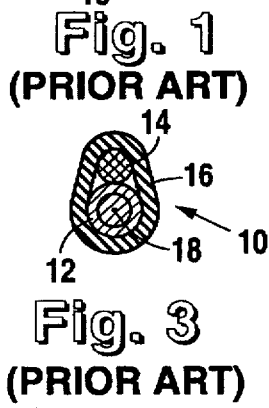
FIG. 3 is an end view of a prior art splice protection assembly after heating.
Figure 4:
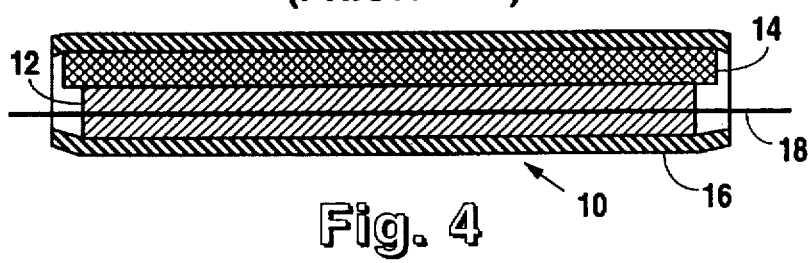
FIG. 4 is a cross sectional view of a prior art splice protection assembly after heating.

FIGS. 1–4 illustrate a prior art fusion splice protection assembly 10 comprising a hot melt tube 12 and a support element 14 located inside a heat shrink tube 16. The assembly 10 requires positioning over the end of an optical fiber 18 after preparing it for fusion splicing but before connecting it, by fusion, to at least one other optical fiber. Those skilled in the art will appreciate that such a splice may interconnect a single fiber with multiple fibers, or interconnect a first plurality of fibers with a second plurality of fibers. As the figures show, there is no way to position the fusion splice protection assembly around the fiber splice after formation of the fused section of fiber. It is, therefore, important, prior to fusion splice formation, to thread an optical fiber 18 through the hot melt tube 12 which itself is surrounded by the heat shrink tube 16. The cylindrical support element 14 occupies a position between the outer wall of the hot melt tube 12 and the inner wall of the heat shrink tube 16. Assembly 10 occupies a position some distance from the optical fiber connection site during the fusion splicing process. After splicing, movement of the splice protection assembly 10 aligns it to cover the fused connection. The fused portion of the fiber 18 is normally positioned in the approximate center of the splice protection assembly 10. Application of heat to the assembly 10 causes the hot melt tube 12 to soften as the heat shrink tube 16 recovers. The action of the heat shrink tube 16 compresses the support element 14 against the softening hot melt material. As the space inside the heat shrink tube 16 decreases, assembly 10 exerts a gripping action on the protected length of the optical fiber. This seals the fusion splice with adhesive that also binds it to the support element 14, which is held firmly in position by forces acting through the recovered heat shrink tube 16.

Material chosen for the prior art cylindrical support element 14 is typically a metal such as steel to provide good strength against tension, shear and bending. Unfortunately, the rate of thermal expansion for steel is greater than for an optical fiber made of silica. Stresses induced in the fusion splice by the disparity in thermal expansion coefficients may lead to fatigue and ultimately failure during operation subject to large temperature variations. Attempts to provide support elements with matching coefficients of thermal expansion gave rise to the use of rigid materials such as glass and ceramics. Neither metal nor glass nor ceramic support elements provide protection sufficient to meet standard test requirements for bending (see Bellcore Technical Advisory TA-NTW-01380).

Figure 5:
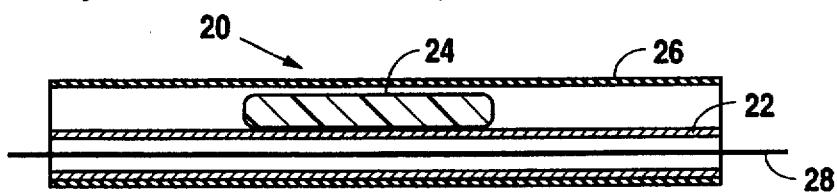
FIG. 5 is a cross sectional view of one embodiment of a splice protection assembly according to the present invention.

FIG. 5 shows a splice protection assembly 20 of the current invention comprising a hot melt tube 22 and support element 24 positioned inside a heat shrink tube 26. The support element 24 is flexible and preferably has a coefficient of thermal expansion approximately matching that of the optical fiber 28. A polymer, polymer blend or composite provides material for the support element 24. The polymer blend may comprise negative temperature coefficient and positive temperature coefficient polymers combined to match the expansion coefficient of the optical fiber 28.

Polymers suitable for blend formation include liquid crystal polymers and suitable blending polymers. Liquid crystal polymers have an ordered structure resulting from linear orientation of polymer chains. They exhibit a slightly negative coefficient of thermal expansion along the axis of orientation. Suitable liquid crystalline polymers of the invention include but are not limited to the Celazole and Vectra brands from Hoechst Celanese, and the Xydar brand from Amoco. Blending polymers of the invention generally exhibit positive coefficients of thermal expansion and include polyamides (nylon 6; nylon 6,6; and nylon 12), polyesters (PET, PBT) and others such as polycarbonate, polypropylene and polyethersulfone.

Work reported in 1987 by Tai-Shung Chung ("How well do various blends of Liquid Crystalline Polymer and Nylon 12 Work?" Plastics Engineering, October, 1987) indicates that property adjustment, as a function of polymer proportions, is possible by blending a liquid crystal polymer with nylon. No previous work applies these studies to coefficient of expansion matching for fusion splice protection.

Effective polymer blend formation, using liquid crystalline polymers with blending polymers, produces material for flexible support elements that overcome the problems of bending previously described. A polymer blend support element made to match the coefficient of thermal expansion of glass will have excellent performance over a very wide range of temperatures. It also exceeds the performance of other polymeric support elements since their rate of thermal expansion differs from that of the optical fiber. This advantage is further strengthened by optimizing the length and shape of the support element. Depending on its shape the support element can be bent to a greater deflection without undergoing plastic deformation, as compared to the metal or ceramic strength elements of the prior art. Further, in support elements that become thinner towards the ends, or are otherwise contoured or shaped to make the ends more flexible, there is strain relief from forces applied to the side of the splice protective assembly. This is particularly valuable under conditions where the force is applied sharply because the ends of the support element flex in response.

The relative amounts of polymer materials useful for blends of support elements cover the ranges of 0–100% Liquid Crystalline Polymer combined with 0–100% blending material, e.g. polypropylene, nylon 12, Lexan polycarbonate, Amoco Ultem, PPS, etc.

Suitable hot-melt adhesive materials are those with melting or softening temperatures below the temperature (typically 120° C.) of the heater that causes the recovery of the heat shrink tubing. The most common and preferred material is ethylene vinyl acetate. Heat shrinkable outer sleeves of the invention employ polymers typically used in these applications such as crosslinked polyethylene or THV tubing available from Minnesota Mining and Manufacturing Company (3M-assignee of the present invention).

Figure 6:
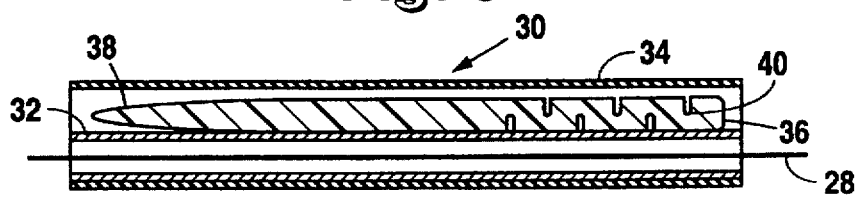
FIG. 6 is a cross sectional view of a combination of embodiments of the splice protection assembly of the present invention.

FIG. 6 shows an alternate splice protection assembly 30 comprising a hot-melt tube 32, heat shrink tube 34 and support element 36. Shaping of the support element 36 may employ several possible methods to provide gradual bending for strain relief as the fiber exits heat shrink tube 34. As shown the support element 36 may have a tapered end 38, or a slotted end 40 that has been shaped to provide flexibility. Manufacture of support elements could introduce tapered ends, slotted ends or combinations thereof for optimal fusion splice protection. FIGS. 7A and 7B show another type of support element 50 possessing features of a rigid central portion 52 and flexible, tapered end portions 54 and 55. In addition the support element 50 has a longitudinal, U-shaped channel 56 that allows greater circumferential protection, for the hot melt material 58 and optical fiber 59, than with support elements discussed previously. In each of these embodiments, the support element is stiffer in the middle than at the ends and will flex at the ends to prevent fiber fracture upon side loading as previously described. Support elements may also be fabricated according to the present invention by providing a rod or member which has a constant cross-section (i.e., not tapered or slotted) but which has been made by combining two or more materials having differing moduli of elasticity, for example, having more of a rigid material present along the central portion of the member and having more of a flexible material present at the ends. Also, it is not necessary that the support element be tapered in a radially symmetric fashion, i.e., it could be tapered only along one of the x/y axes.

Splice support element manufacture uses methods of either rod extrusion or injection molding. The extrusion method produces a continuous, flexible rod of uniform cross-section while injection molded support elements have a greater variety of shapes. Ability to change the shape of the splice support element leads to another embodiment of the invention that eliminates need for a protective heat shrink sleeve.

FIGS. 8 and 9 show fusion splice protective assemblies 80 and 80' of the invention employing support components 82, 82' that also replace the heat shrink tube to provide protection. The support components 82, 82' may or may not be heat recoverable. Protected splice structures, as shown in FIGS. 8 and 9, result from successful installation of the protecting support component 82, 82' over a fusion spliced optical fiber 84, 84' surrounded by hot melt material 86, 86'. The channel may be a straight channel 88 as shown in FIG. 8 or a helical channel 90 as in FIG. 9. The size of the closed ends 87, 87' and either channel 88 or 90 is large enough to receive a spliced section of the optical fiber 84, 84' covered by several wraps of hot melt film. Thus, with the optical fiber fully inserted in the protective support component, application of heat melts the hot melt material causing it to flow around the optical fiber thereby bonding it and the fiber to the support component. A further advantage of this design is the ability to apply the support component around the spliced portion of the optical fiber after splicing.

Injection molded support elements of the invention preferably require the use of engineering resins such as examples 2, 3, 4, 6 and 7 in the following table. The modulus should generally be less than about 3000 ksi. Example 1, and others such as low density and high density polyethylenes, polypropylene, ethyl vinyl acetate and nylon 12, may be too soft due to distortion at high temperature.

TABLE 1

| Sample | Material | Supplier | Trade Name |
|---|---|---|---|
| 1 | Polyester (PBT) | General Electric | Valox 357 |
| 2 | Polycarbonate | General Electric | Lexan 141 |
| 3 | Polyethersulfone | Imperial Chemical Ind. | Victrex 4100G |
| 4 | Polysulfone | Amoco | Udel P1700 |
| 5 | Polystyrene | Amoco | R9 |

TABLE 1-continued

| Sample | Material | Supplier | Trade Name |
| --- | --- | --- | --- |
| 6 | Polyetherimide | General Electric | Ultem 1010 |
| 7 | LCP/Glass | Hoechst Celanese | Vectra A130 |

In addition to the benefits previously described, a color code may provide indication of the intended performance of a given support element. Thus color selection could reflect relative strength within a series of support elements.

EXPERIMENTAL

A blend of 75% liquid crystal polymer (A900—Unfilled Vectra thermotropic liquid crystal polymer available from Hoechst Celanese) with Grilamid L20 nylon 12 (available from EMS-American Gillon Inc., of Sumter, S.C.), upon extrusion, using a Haake single screw, ¾" Rheocord 40 extrusion system, provided rods of about 0.060 inch in diameter for testing. Preparation of polymer blend pellets for extrusion included addition of the liquid crystalline polymer (LCP) to a Brabender mixer heated to 290° C. At this temperature the LCP melts. Nylon formed a blend with the LCP during high temperature mixing that lasted for about 1 minute. After removal from the mixer the blend cooled before grinding. The pelletized blend, obtained with use of a hammer mill, was stored in a hopper dryer at 175° F. Extrusion conditions included zone temperatures of 190/200/200/200° C. for the four zone extruder. The rod die diameter was 0.125". The extruded rod cooled in air before collection at an untensioned take-up station.

Figure 10:
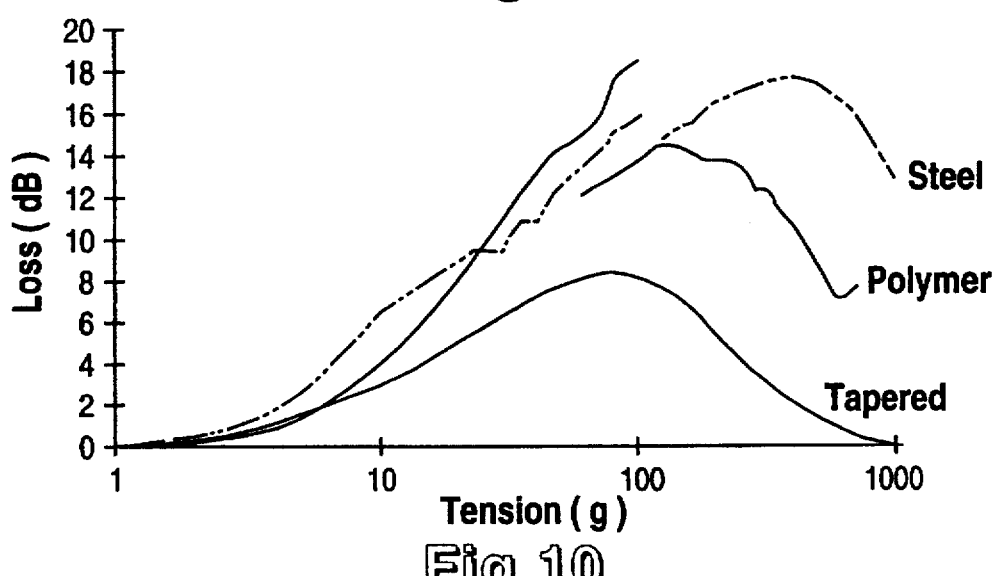
FIG. 10 is a graphical depiction of ability of support elements of the invention to withstand lateral forces applied to the splice protection assembly of the invention.

A fusion splice protection assembly comprised an extruded rod, as just described, for the splice support element, a hot melt tube of EVA as used in 3M heat shrink products, and a heat shrink sleeve of expanded polyethylene as used in 3M heat shrink products. This assembly, compared to the prior art 3M 2170 protective assembly product, reduced transmission loss for the fiber to more acceptable levels, especially at higher levels of side-pull tension. FIG. 10 shows results of side pull testing. In one example, 600 g of tension in the side pull test produced loss of 17.0 dB with a steel support element but only 7.4 dB when the support element was a polymer blend of the invention. Above 10 g of tension, it is clear that the tapered polymer support element reduces transmission loss over the further range of testing.

Three tapered support elements, and an element as shown in FIG. 7, were injection molded in a Gluco injection molder with standard processing conditions for each of the materials listed in Table 1. Material properties of the resulting elements are listed in table 2.

TABLE 2

| Sample | Tensile (ksi) | Flex. Modulus (ksi) | Elongation % | CTE ppm/F |
| --- | --- | --- | --- | --- |
| 1 | n/a | 300 | 110 | 51 |
| 2 | 345 | 340 | 7 | 37.5 |
| 3 | n/a | 373 | 60 | 30.5 |
| 4 | 360 | 390 | 75 | 31 |
| 5 | 460 | 435 | 1 | n/a |
| 6 | 430 | 480 | 60 | 31 |
| 7 | 2400 | 2100 | 2 | 2.78 |

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. An article for protecting a fusion splice of two or more optical fibers, comprising:

an elongate sleeve member having a central portion and first and second ends, said sleeve member adapted to surround the fusion splice and adjacent portions of the optical fibers; and means adjacent said sleeve member for reinforcing said sleeve member, said reinforcing means having a center portion and two ends wherein said reinforcing means is more rigid at said center portion than at said two ends, said reinforcing means allowing said sleeve member to flex along the length of said reinforcing means in response to a lateral force applied to one of the fibers and elastically recover when the lateral force is removed, said reinforcing means controlling flexibility along a length of said sleeve member such that said sleeve member is more rigid adjacent said center portion than adjacent said two ends of said reinforcing means.

2. The article of claim 1 further comprising means for retaining said reinforcing means adjacent a longitudinal section of said sleeve member.

3. The article of claim 1 wherein said sleeve member is constructed of a heat-recoverable material.

4. The article of claim 1, wherein said reinforcing means comprises an elongate support element having two ends, at least one of which is tapered.

5. The article of claim 1 wherein said reinforcing means comprises an elongate support element having a length which is shorter than the length of said sleeve member.

6. The article of claim 1 wherein said reinforcing means comprises an elongate support element having two ends, at least one of which is slotted.

7. The article of claim 1, wherein said reinforcing means comprises an elongate support element constructed of a polymer or polymer blend.

8. The article of claim 1 wherein said reinforcing means includes an elongate support element constructed of a material having a coefficient of thermal expansion which is approximately equal to the coefficient of thermal expansion of the optical fibers.

9. The article of claim 1 wherein said reinforcing means comprises an elongate support element constructed of a material having a modulus of elasticity less than 3000 ksi.

10. The article of claim 2 wherein said retaining means comprises a hot-melt adhesive.

11. The article of claim 7 wherein said support element has two ends, at least one of which is slotted.

12. The article of claim 7 wherein said support element has two ends, at least one of which is tapered.

13. The article of claim 7 wherein said support element is constructed of a material having a coefficient of thermal expansion which is approximately equal to the coefficient of thermal expansion of the optical fibers.

14. The article of claim 8, wherein said material is selected from the group consisting of polymers, polymer blends, and composites.

* * * * *